United States Patent [19]

Bey

[11] Patent Number: 5,799,695

[45] Date of Patent: Sep. 1, 1998

[54] FLOW REGULATING VALVE OF THE BALL OR PLUG TYPE

[75] Inventor: Roger Bey, Illzach, France

[73] Assignee: Neles-Jamesbury, Inc., Worcester, Mass.

[21] Appl. No.: 424,440

[22] PCT Filed: Nov. 2, 1993

[86] PCT No.: PCT/FR93/01080

§ 371 Date: May 8, 1995

§ 102(e) Date: May 8, 1995

[87] PCT Pub. No.: WO94/11659

PCT Pub. Date: May 26, 1994

[30] Foreign Application Priority Data

Nov. 6, 1992 [FR] France ................ 92 13577

[51] Int. Cl.[6] ............................... F16K 47/02
[52] U.S. Cl. ........................ 137/625.32; 251/127
[58] Field of Search ............. 137/625.28, 625.31, 137/625.32; 251/127

[56] References Cited

U.S. PATENT DOCUMENTS

| | | | |
|---|---|---|---|
| 3,677,297 | 7/1972 | Walton | 137/625.28 |
| 3,908,698 | 9/1975 | Baumann | 137/625.3 |
| 4,610,273 | 9/1986 | Bey | 137/625.32 |
| 4,846,213 | 7/1989 | Hutchens | 137/625.32 X |
| 4,889,163 | 12/1989 | Engelbertsson | 137/625.32 |
| 5,218,984 | 6/1993 | Allen | 137/625.31 X |

FOREIGN PATENT DOCUMENTS

| | | |
|---|---|---|
| 1517003 | 3/1968 | France . |
| 1836861 | 8/1961 | Germany . |
| 2457226 | 6/1975 | Germany . |
| 552453 | 3/1977 | Russian Federation . |
| 552453 | 5/1977 | U.S.S.R. ............ 137/625.32 |
| 2087517 | 5/1982 | United Kingdom . |
| WO85/05041 | 11/1985 | WIPO . |
| WO88/05880 | 8/1988 | WIPO . |

Primary Examiner—John Rivell
Attorney, Agent, or Firm—Oblon, Spivak, McClelland, Maier & Neustadt, P.C.

[57] ABSTRACT

The flow regulating valve (10) of the ball or plug type comprises a ball (13) which rotates about a rotation axis (14) and comprises a shut-off area (15) and a regulation area (16). The regulation area (16) comprises a series of channels (160) arranged in planes substantially perpendicular to the rotation axis (14) and which are provided with an expansion area (161). At the initial opening of the valve, the surface of the channels (160) in contact with the inlet line (17) is reduced. Frictions are created in the channel (160) and in the expansion area (161) thereby providing for an important load loss. At the end of the opening, the surface of the channels in contact with the inlet line is important. The fluid circulated in planar sheets, without swirls and with a low load loss.

Applications: Pressure fluid supply circuit, high differential pressure circuit, decompression circuits, pressure equilibrating circuits.

25 Claims, 3 Drawing Sheets

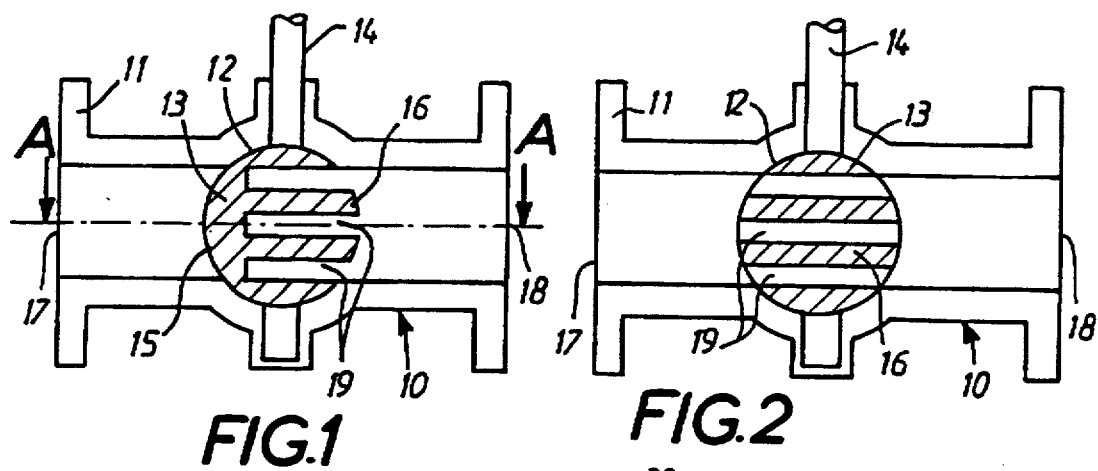
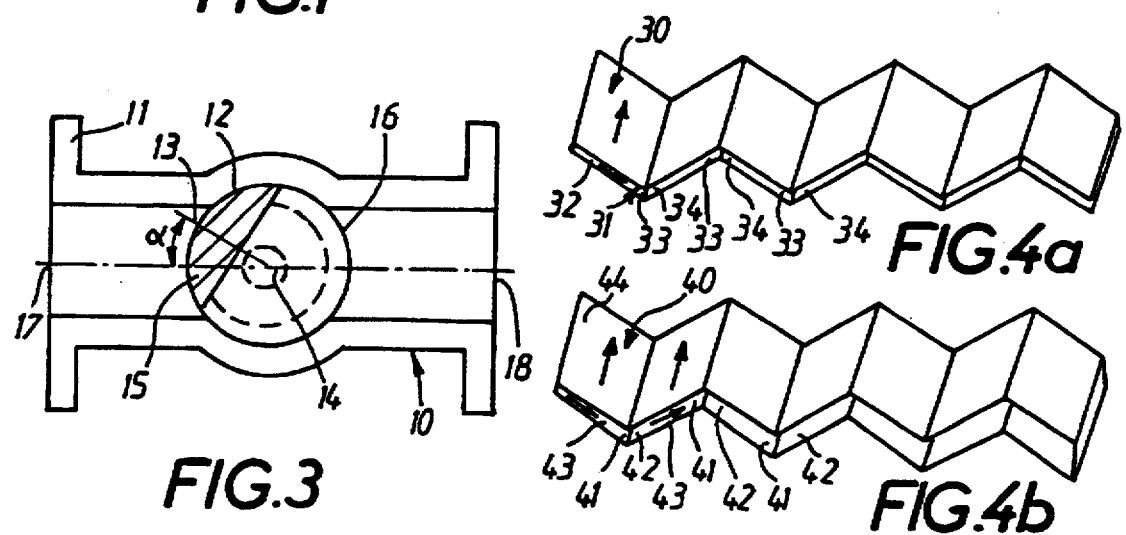
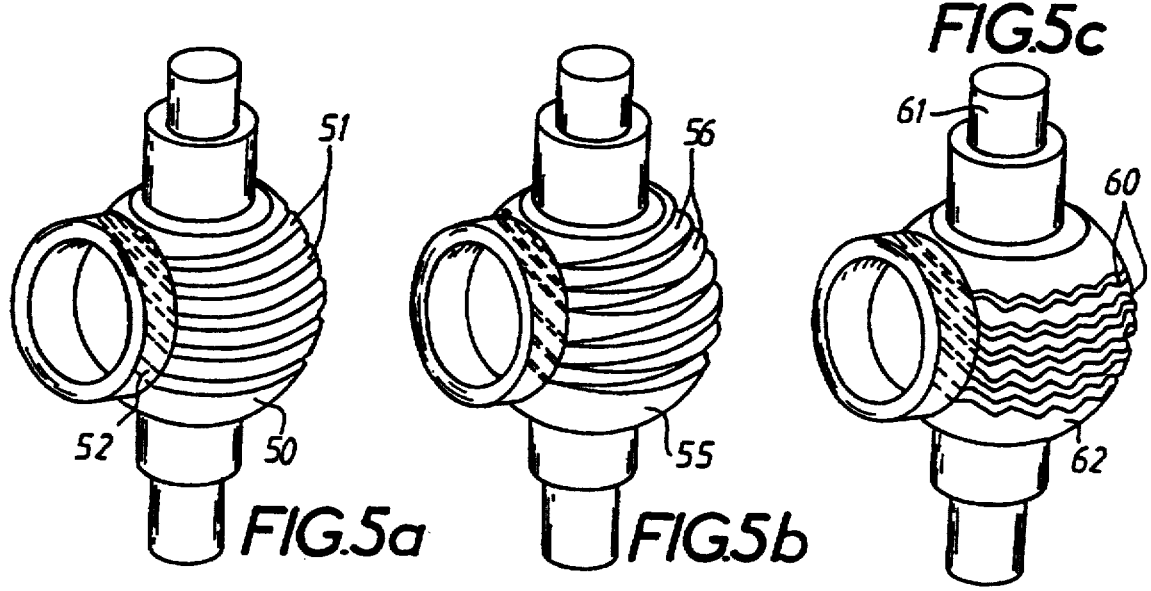

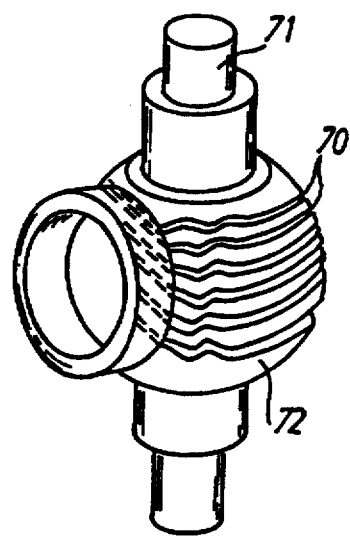 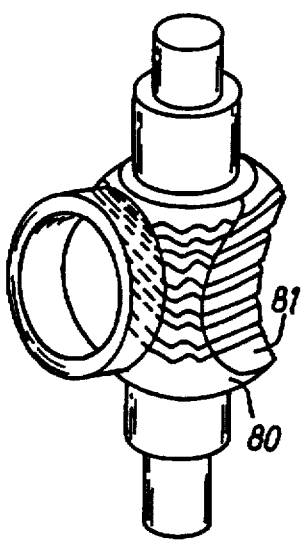 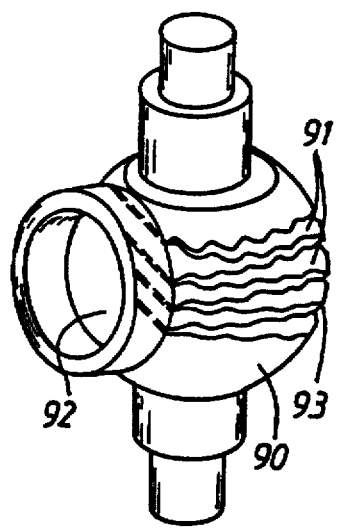
*FIG.5d*    *FIG.5e*    *FIG.5f*
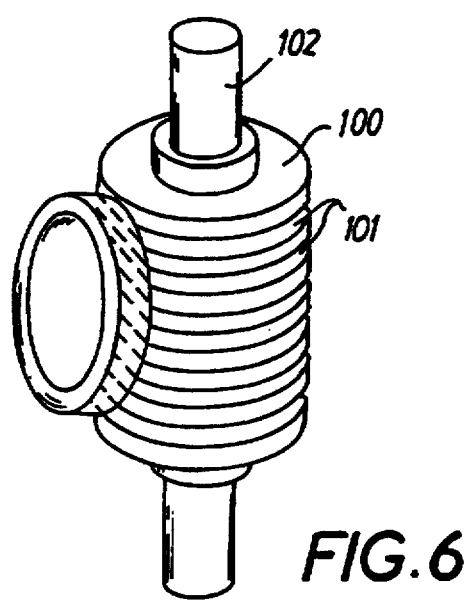 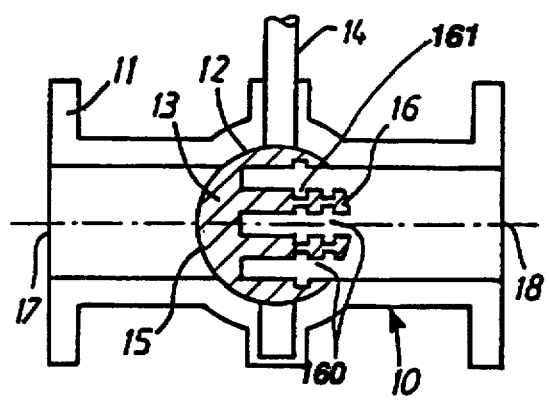
*FIG.6*    Fig. 7

FLOW REGULATING VALVE OF THE BALL OR PLUG TYPE

BACKGROUND OF THE INVENTION

1. Field of the Invention

The present invention relates to a flow control valve comprising a body connected to an inlet pipe and to an outlet pipe aligned with an axis called the valve axis, this body being provided with a recess in which is housed a ball or plug which rotates around an axis situated in a plane perpendicular to the valve's axis, the ball or plug comprising at least one shut-off area of said valve extending over part of its circumference and defining a closed position when the shut-off area is opposite the inlet pipe, and a control area for the fluid circulating in the valve extending over the rest of its circumference and defining a control position when part of the shut-off area and part of the control area are opposite the inlet pipe, the ball furthermore defining an open position when the control area is opposite the inlet pipe.

2. Discussion of Background

Well-known flow control valves are generally made up of a body provided with an orifice and a plug arranged to more or less shut off this orifice. The orifice is generally circular shaped and the plug cone shaped. By inserting the cone shaped plug more or less in the circular orifice, the fluid flowing through the valve can controlled. This type of valve presents one major drawback, i.e. the control stroke is very short, which in some cases is insufficient to guarantee fine control.

Another drawback with this kind of valve stems from the fact that there is virtually no drop in pressure when the valve starts to open. Indeed, when the valve starts to open, the potential energy is suddenly converted into kinetic energy, thus resulting in high fluid velocity, which causes erosion and turbulence. This phenomenon also generates vibrations in the valve and increases the noise level and mechanical fatigue. As the erosion does not have the same effect on the shut-off plate and on the needle, the valve's tightness can no longer be guaranteed after a relatively short period of use.

Another well-known type of valve used for flow control purposes, comprises a body provided with a recess in which moves a piston. The valve's body is provided with a series of parallel disks which are spaced out and arranged in a plane perpendicular to the piston's axis of displacement. When the valve is closed, the piston seals this valve's orifice completely. When the valve starts to open, the piston first of all frees a space between two first parallel disks. When the piston is displaced further, a second space is freed between the next two disks, then a third space and so on and so forth. The control operation is therefore performed in stages, discontinuously, which in some applications is not satisfactory. Furthermore, as only slight drops in pressure are brought about when the valve starts to open, the above-mentioned problems, particularly those due to erosion, vibrations, mechanical fatigue and noise, are not resolved. Another well-known control valve comprises a ball provided with a spherical insert. This insert is made up of a spherical cap and a series of plane plates set out more or less parallel to each other and to the plane of the spherical cap. This spherical cap comprises a solid part sized so that when it is situated opposite the valve's inlet pipe, it seals it completely and thus prevents the fluid to flow through said valve. Furthermore, this spherical cap comprises peripheral openings designed to allow the fluid to flow through the valve when it starts to open. The solid plates comprise orifices arranged perpendicular to their surface and designed to allow the fluid to pass through the valve when it starts to open and they are separated by a space allowing the fluid to flow through at the end of the opening. The drop in pressure when the valve opens is considerable and the flow is controlled over a relatively long travel. However, the disadvantage of this type of valve is that its practical embodiment requires substantial machining and difficult fitting of the parts, which results in high manufacturing costs.

Another well-known control valve is described in the German publication DE-A-24 57 226. One particular embodiment of this valve represents a ball valve provided with a central or peripheral notch designed to improve the valve's control function. The disadvantage of this valve is that if one wants a big drop in pressure when the valve starts to open, the notch has to be small, which reduces the flow rate.

The French publication FR-A-1 517 003 describes a valve designed to calibrate the flow of gas depending on the type of gas. It comprises a truncated body connecting the gas supply and outlet pipes perpendicularly, this body being provided with flow bores or slots arranged parallel and of various dimensions. For each type of gas, there is a type of plug which cooperates with the inside of said body and is arranged to shut off a part of the bores or slots. This valve was designed to solve the problem of calibration with gas. It does not in any way make it possible to control a flow of liquid.

SUMMARY OF THE INVENTION

The present invention proposes to overcome these drawbacks by providing a control valve which has a long control travel and ensuring a considerable drop in pressure when the valve opens, whilst being both easy and economical to make.

This object is achieved by a valve such as the one described in the introduction, characterized in that the ball or plug comprises several peripheral, superposed channels crossing right through said ball or said plug, said channels each having a smaller cross section than the cross section of the inlet pipe, and being more or less parallel to one another and having a center plane perpendicular to the ball's or plug's axis of rotation, the inner edge of said channel being more or less parallel to the valve's axis when the ball or plug is in the open position, said channels then being arranged to the fluid's axis of streaming.

The plane which defines the general direction of the channels is called the "center plane", it is parallel to the axis which defines the inlet and outlet pipes, and perpendicular to the axis of the ball or the plug. It also corresponds to the plane of symmetry of said channels. They may also comprise a plane part and a part presenting tortuous profiles.

According to another embodiment, said channels may present a cross section with a divergent profile.

According to one alternative, the channels comprise an expansion area the thickness of which is greater than that of the rest of the channel. This expansion area may comprise a transversal groove with a more or less rectangular cross section, a triangular cross section or be made up of several transversal grooves.

According to another form of embodiment, the channels may comprise at least one transversal baffle.

Furthermore, the ball or plug may comprise a lateral notch arranged so that part of said lateral notch is in contact with the inlet pipe and another part of the lateral notch is in contact with the outlet pipe when the ball is in the open position.

The present invention and its advantages will be more fully disclosed in the description of examples of embodiments with reference to the attached drawing, in which:

BRIEF DESCRIPTION OF THE DRAWINGS

FIG. 1 is a vertical cutaway view of a form of embodiment of a valve according to the present invention, in the closed position, FIG. 2 is a vertical cutaway view of the valve in FIG. 1 in the open position, FIG. 3 is cutaway view along the A—A line of the valve in FIG. 1 in the control position, FIGS. 4a to 4g are schematic perspectives of forms of channels as they may be embodied in a ball or a plug according to the present invention, FIGS. 5a to 5f are perspectives of examples of embodiment of balls for a valve according to the present invention, FIG. 6 is a perspective of an example of embodiment of a plug for a valve according to the present invention, and FIG. 7 is a vertical cutaway view of an alternative embodiment of a valve according to the present invention, in the closed position.

DESCRIPTION OF THE PREFERRED EMBODIMENTS

Figure 4C:
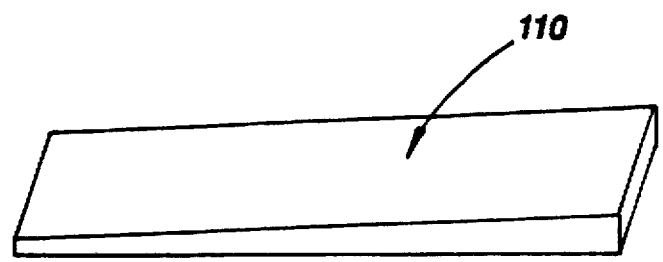

With reference to FIGS. 1 to 3, the valve 10 comprises a body 11 provided with a recess 12 in which is housed a ball 13. This ball rotates around an axis 14 and on a first part of its periphery has a shut-off area 15, and on a second part of its periphery a control area 16. The shut-off area 15 is arranged so as to prevent a fluid supplied by an inlet pipe 17 connected to the body 11 of the valve, from flowing through to an outlet pipe 18 also connected to the valve's body 11. Said inlet and outlet pipes are aligned along an axis called the valve's axis. The control area 16 is designed to allow a fluid to flow through from the inlet pipe 17 to the outlet pipe 18. This control area comprises channels 19 in the form of plane passages arranged along parallel planes which are more or less perpendicular to the axis of rotation 14 and run right through the ball.

The ball revolves around its axis of rotation at an angle α called the opening angle, α being defined as the angle formed between the valve's axis and the straight line running through the centre of the ball and the centre of the shut-off area. This opening angle is nil when the ball is in the closed position. It is equal to 90° or more when said ball is in the open position, and varies between 0° and 90° or more when the ball is in the control area.

According to this type of embodiment, when the opening angle is nil, the shut-off area 15 is the continuation of the inlet pipe 17 and the fluid can not flow through the valve. When the ball 13 is rotated around the axis of rotation 14, part of the channels 19 progressively become part of the continuation of the inlet pipe 17. When there is a small opening angle α, only a small area of these channels is in contact with the inlet pipe. The quantity of fluid which can flow through the channels and therefore through the valve is small.

For larger opening angles β, the area of the channels 19 in contact with the inlet pipe 17 is greater. A larger quantity of fluid can therefore flow through the valve. Controlling the opening angle β therefore allows precise control of the quantity flowing through the valve.

For smaller opening angles β, the fact that the channels are small creates considerable friction which generates high pressure drops and thus avoids the problems created by the valve opening too suddenly.

FIG. 4a represents a first alternative embodiment of the ball's channels. One of these channels 30 has undulations, the profile of which presents a succession of angular areas 31 and plane areas 32. Each angular area can be separated into a pre-angular area 33 and a post-angular area 34.

In this type of channel, the fluid flows as follows. When the valve starts to open, the fluid moves by following the profile of the channels. It first of all encounters a plane area 32, then a pre-angular area 33 in which it undergoes a slight expansion. It then continues into a post-angular area 34 where it undergoes a slight compression and so on and so forth. These compression and expansion cycles bring about a significant drop in pressure when the valve starts to open.

When the valve finishes opening, the fluid moves transversally through all the plane areas 32. Each portion of fluid moves in a plane and forms a set of sheets of fluid. There are no more compression and expansion cycles, therefore virtually no more drops in pressure when the valve finishes opening. The sheets can be made up of more or less plane portions when the profile of the channels corresponds to a broken line. These sheets may have a warped surface for example when the channels have an undulated, sinusoidal or similar profile.

FIG. 4b represents a second alternative embodiment of the ball's channels. This arrangement is particularly advantageous in the case where the fluid flowing through the valve is a compressible fluid. One of the channels 40 comprises a pre-angular area 41, a post-angular area 42, a longitudinal plane area 43 and a transversal plane area 44 which gives it an undulated form.

In this embodiment, the drop in pressure is significant when the valves starts opening and virtually inexistent when it finishes opening.

Indeed, given the fact that the profile of the channel 40 presents a divergent cross section, when the ball is in the control position, the pressure being exerted on the fluid in the part of the valve connected to the inlet pipe, is greater than the pressure of the fluid in the part of the valve connected to the outlet pipe. The fluid thus undergoes an expansion along with an increase in volume which are possible as the channels present a profile with a divergent cross section.

FIG. 4c illustrates a third alternative embodiment of the ball's channels. As in the case of the alternative illustrated by FIG. 4b, this embodiment is particularly advantageous when a compressible fluid circulates in the valve. Indeed, the fact that the cross section of the channel 110 is defined by two divergent lines means that the fluid can be expanded.

Figure 4D:
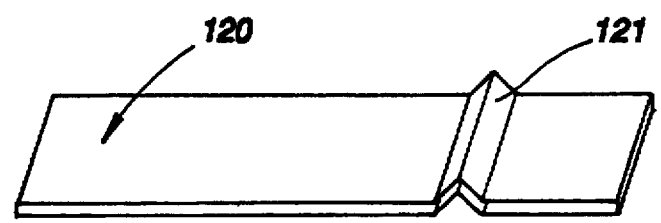

FIG. 4d illustrates a fourth alternative embodiment of the ball's channels. In this alternative, the channel 120 comprises a transversal baffle 121 arranged so that it prevents the fluid from shooting directly through the valve when the latter starts opening. When it finishes opening, the fluid flows through in fluid sheets in a similar way to the one which was explained with reference to FIG. 4a.

Figure 4E:
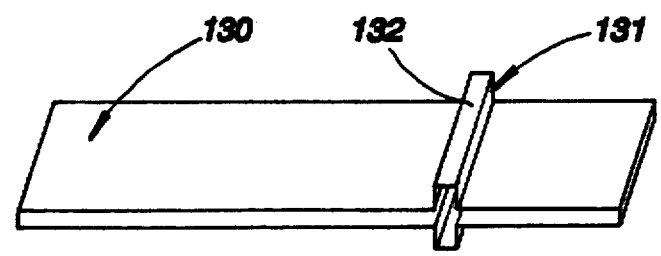

In the alternative illustrated by FIG. 4e, an expansion area 131 has been added on the channel. It is presented in the form of a transversal groove 132 with a more or less rectangular cross section. When the valve starts to open, the fluid flows from the channel 130 into the expansion area 131 and it undergoes an expansion. When it then flows from the expansion area into the channel which prolongs this area, it undergoes a compression. These expansions and compressions produce a drop in pressure when the valves starts opening.

Figure 4F:
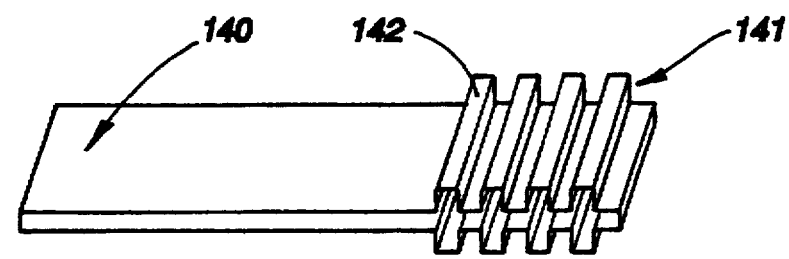

The embodiment illustrated by FIG. 4f is similar to the one illustrated in FIG. 4e. The difference lies in the fact that the expansion area 141 of the channel 140 in FIG. 4f comprises several transversal grooves 142, which increases the number of expansions and compressions. The drop in pressure when the valve starts opening is thus greater.

Figure 4G:
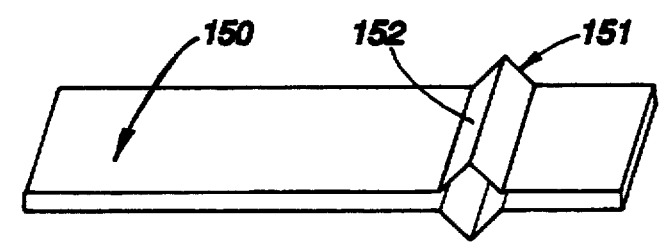

In the embodiment illustrated by FIG. 4g, the expansion area 151 of the channel 150 comprises a more or less triangular transversal groove 152. This embodiment again makes it possible to achieve a drop in pressure when the valve starts opening by creating an expansion and a compression in the fluid.

FIGS. 5a to 5f show several forms of embodiment of the ball fitting the valve.

With reference to FIG. 5a, the ball 50 comprises channels 51 made in the form of plane openings which are parallel to one another and extend from the periphery of the ball 50 inwards. These openings are arranged so that when the valve is in the open position, the inner edges 52 of the channels are more or less parallel to the valve's axis.

In this form of embodiment, only a small area of the channels 51 is in contact with the inlet pipe when the valves starts opening. When the valve is fully open, all the available area of the channels is in contact with the inlet pipe. When the valve starts opening, the small contact surface between the channels 51 and the inlet pipe creates swirls and consequently, considerable drops in pressure, whereas when the valve finishes opening, the fluid flows through the ball easily without undergoing a considerable drop in pressure.

With reference to FIG. 5b, the ball 55 comprises plane channels 56 presenting a cross section with a divergent profile. This form of channel which has a cross section with a divergent profile is used as mentioned with reference to FIG. 4c, for compressible fluids with the aim of allowing the fluid to expand.

FIG. 5c illustrates a ball comprising channels 60 such as the one shown by FIG. 4a. The profile of these channels is undulated around a plane which is more or less perpendicular to the ball's 62 axis of rotation 61. These channels can have a broken line profile, a sinusoidal profile or any other undulated profile.

In this form of embodiment, the purpose of the undulated profile of the channels 60 is to increase the drop in pressure further. When the ball starts to open, the fluid flows longitudinally in the channels. Each time a portion of fluid arrives near an undulation, it is compressed. As soon as this portion has passed said undulation, it expands. This series of compression and expansion cycles brings about a significant drop in pressure.

When the ball is in the open position, the fluid flows transversally in the channels. Each portion of fluid moves in a plane. There are therefore no more compression or expansion cycles, therefore no more drops in pressure.

With reference to FIG. 5d, the channels 70 present undulations around planes which are more or less perpendicular to the ball's 72 axis of rotation 71 in a first area extending inwards from the ball, and which are prolonged by more or less plane channels in a second area extending towards the periphery of the ball. This embodiment can be considered as a combination of the embodiments according to FIGS. 5a and 5c.

In this form of embodiment, the undulated form of the channels 70 ensures a considerable drop in pressure when the valve starts opening, whereas the plane part of the channels generates a more or less laminar flow on the valve's outlet side. When the valve finishes opening, the fluid circulates in plane sheets of fluid whatever the form of the channels 70.

With reference to FIG. 5e, the ball 80 comprises a lateral notch 81, the size and position of which are adapted to allow a fluid to flow directly from the inlet pipe to the outlet pipe when the ball is in the open position.

According to this embodiment, when the ball 80 starts to open, only the channels allow the connection between the inlet pipe and the outlet pipe. They ensure a significant drop in pressure when opening starts. When the opening angle β gets bigger, the lateral notch 81 also provides the connection between the inlet pipe and the outlet pipe, which makes it possible to reduce the drop in pressure and increase the flow rate.

The ball 90 illustrated by FIG. 5f comprises channels 93 in undulated form like the one described with reference to FIG. 4b and used in the case of a compressible fluid.

The valve according to the invention can also be fitted with a plug 100 such as shown by FIG. 6. This plug 100 comprises peripheral channels 101, located in parallel planes which are more or less perpendicular to its axis of rotation 102.

In this form of embodiment, the channels 101 are arranged so that only a small effective area of the channels is in contact with the inlet pipe when opening starts, whereas a large area of said channels provides the connection between the inlet pipe and the outlet pipe in the case of a bigger opening. The plug 100 rotating around the axis of rotation 102 therefore ensures control of the quantity of fluid flowing through the valve.

FIG. 7 shows a similar embodiment to the one in FIG. 1, in which the rectilinear channels in FIG. 1 have been replaced by channels which have an expansion area 161 of the type of the one shown by FIG. 4f.

These various forms of embodiment operate in similar ways and all make it possible to achieve the purposes set by the invention.

The present invention is not restricted to the examples described above and can be extended to cover any modifications or alternatives which are obvious to the expert. The various forms of channels and expansion areas can in particular be made in either balls or plugs.

I claim:

1. A control valve comprising:

a valve body having an inlet opening and an outlet opening, and wherein a valve axis extends in a direction from said inlet opening to said outlet opening;

a closure element comprising one of: (a) a ball closure element, (b) a segmented ball closure element, and (c) a plug closure element; said closure element disposed in said valve body and mounted for movement between a first position and a second position, wherein said first position corresponds to a closed position at which said closure element prevents flow from said inlet opening to said outlet opening, and wherein said second position corresponds to an open position at which fluid is allowed to pass from said inlet opening to said outlet opening; and wherein said closure element includes at least one channel extending through said closure element and disposed such that when said closure element is in said first position, said channel extends from a downstreammost end of said closure element and in a first direction toward an upstreammost end of said closure element, and further wherein said at least one channel extends completely through said closure element in a second direction extending from an upstreammost end to a downstreammost end of said closure element when said closure element is in said second position, and wherein said at least one channel includes at least one undulation, and wherein said at least one channel includes an upstream end and a downstream end when said closure member is in said first position, and further wherein said at least one undulation is disposed between said upstream end of said channel and said downstream end of said channel.

2. A control valve as recited in claim 1, wherein said control valve is a rotary control valve and includes means for rotating said closure element about an axis of rotation, and further wherein said second direction extends perpendicular to said axis of rotation.

3. A control valve as recited in claim 1, wherein said downstream end of said at least one channel has a first width and said upstream end of said at least one channel has a second width, with said first and second widths extending perpendicular to said valve axis, and further wherein said first width is larger than said second width.

4. A control valve as recited in claim 3, wherein said at least one channel has a width which continuously increases from said second width to said first width such that said at least one channel has a profile with a divergent cross section.

5. A control valve as recited in claim 3, wherein said channel includes a plurality of undulations disposed between said upstream end and said downstream end of said channel when said closure member is in said first position.

6. A control valve as recited in claim 1, wherein said closure element includes a plurality of channels, each of said plurality of channels having a first width at a downstream end and a second width at an upstream end when said closure element is in said first position, and wherein said first width of each of said plurality of channels is larger than said second width of each of said plurality of channels.

7. A control valve as recited in claim 6, wherein each of said channels includes at least one undulation disposed at a location between said upstream end and said downstream end of each of said channels when said closure element is in said first position.

8. A control valve as recited in claim 6, wherein each of said plurality of channels includes a plurality of undulations disposed between said upstream end and said downstream end of each of said channels when said closure element is in said first position.

9. A control valve as recited in claim 1, wherein said at least one channel includes a divergent portion.

10. A control valve as recited in claim 1, wherein said closure element includes a plurality of channels.

11. A control valve as recited in claim 10, wherein said plurality of channels each include at least one undulation.

12. A control valve as recited in claim 10, wherein each of said plurality of channels includes a divergent portion.

13. A control valve as recited in claim 1, wherein said closure element comprises a ball closure element having a notch therein, and wherein when said closure element is in said second position at least a portion of fluid flowing through said control valve passes through said notch without passing through said at least one channel.

14. A control valve as recited in claim 1, wherein said at least one undulation is defined by inner surfaces of said at least one channel disposed such that when said closure element is in said first position and said inner surfaces extend transverse to said valve axis, and when said closure element is disposed at a position between said first position and said second position said inner surfaces defining said at least one undulation define an undulated flow path for fluid flowing through said control valve, and further wherein when said closure element is in said second position said inner surfaces defining said at least one undulation extend in a direction parallel to said valve axis.

15. A control valve as recited in claim 1, wherein said closure element is a ball closure element.

16. A control valve as recited in claim 1, wherein said second direction is perpendicular to said first direction.

17. A control valve comprising:

a valve body having an inlet opening and an outlet opening, and wherein a valve axis extends in a direction from said inlet opening to said outlet opening;

a closure element disposed in said valve body and mounted for movement between a first position and a second position, wherein said first position corresponds to a closed position at which said closure element prevents flow from said inlet opening to said outlet opening, and wherein said second position corresponds to an open position at which fluid is allowed to pass from said inlet opening to said outlet opening; and wherein said closure element includes at least one channel extending through said closure element, said channel having inner surfaces defining at least one undulation therein and disposed such that when said closure element is in said first position said inner surfaces extend transverse to said valve axis and when said closure element is disposed at a position between said first position and said second position said inner surfaces defining said at least one undulation define an undulated flow path for fluid flowing through said control valve, and further wherein when said closure element is in said second position said inner surfaces defining said undulation extend in a direction parallel to said valve axis.

18. A control valve as recited in claim 17, wherein said inner surfaces defining said at least one undulation are alternating planar inclining and declining surfaces.

19. A control valve as recited in claim 17, wherein said inner surfaces defining said at least one undulation define a groove extending transverse to said valve axis when said closure element is in said first position.

20. A control valve as recited in claim 17, wherein said at least one channel extends completely through said closure element from an upstreammost end to a downstreammost end of said closure element when said closure element is in said second position.

21. A control valve as recited in claim 20, further including a plurality of said channels, each having inner surfaces defining at least one undulation.

22. A control valve as recited in claim 17, wherein said at least one channel has a divergent cross-section.

23. A control valve comprising:

a valve body having an inlet opening and an outlet opening, and wherein a valve axis extends in a direction from said inlet opening to said outlet opening;

a closure element comprising one of: (a) a ball closure element, (b) a segmented ball closure element, and (c) a plug closure element; said closure element disposed in said valve body and mounted for movement between a first position and a second position, wherein said first position corresponds to a closed position at which said closure element prevents flow from said inlet opening to said outlet opening, and wherein said second position corresponds to an open position at which fluid is allowed to pass from said inlet opening to said outlet opening;

wherein said closure element includes at least one channel extending through said closure element and disposed such that when said closure element is in said first position, said channel extends from a first channel end disposed at a downstreammost end of said closure element and in a first direction toward an upstreammost end of said closure element with said channel terminating at a second channel end, and further wherein when said closure element is in said second position said at least one channel extends completely through said closure element from said first channel end to said second channel end and in a second direction extending from an upstreammost end to a downstreammost end of said closure element when said closure element is in said second position, and wherein said first channel end has a first width and said second channel end has a second width, with said first and second widths extending perpendicular to said valve axis, and further wherein said first width is larger than said second width; and wherein said channel includes at least one undulation disposed between said first channel end and said second channel end when said closure element is in said first position.

24. A control valve as recited in claim 23, wherein said at least one channel is defined by a pair of substantially planar surfaces extending from said first channel end to said second channel end.

25. A control valve as recited in claim 23, wherein said closure element includes a plurality of channels.

* * * * *